United States Patent
Ogiso et al.

(10) Patent No.: US 10,144,318 B2
(45) Date of Patent: Dec. 4, 2018

(54) SEAT DEVICE (71) Applicant: AISIN SEIKI KABUSHIKI KAISHA, Kariya-shi (JP)

(72) Inventors: Takashi Ogiso, Tajimi (JP); Kazuo Noso, Toyoake (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 12 days.

(21) Appl. No.: 15/101,308

(22) PCT Filed: Nov. 27, 2014

(86) PCT No.: PCT/JP2014/081351
§ 371 (c)(1),
(2) Date: Jun. 2, 2016

(87) PCT Pub. No.: WO2015/083603
PCT Pub. Date: Jun. 11, 2015

(65) Prior Publication Data
US 2016/0304009 A1    Oct. 20, 2016

(30) Foreign Application Priority Data

Dec. 6, 2013    (JP) .................................. 2013-253106
Dec. 6, 2013    (JP) .................................. 2013-253107

(51) Int. Cl.
| A61H 9/00 | (2006.01) |
| B60N 2/44 | (2006.01) |
| B60N 2/62 | (2006.01) |
| A61H 7/00 | (2006.01) |
| B60N 2/90 | (2018.01) |

(52) U.S. Cl.
CPC ............. B60N 2/4415 (2013.01); A61H 7/00 (2013.01); A61H 9/0078 (2013.01); B60N 2/62 (2013.01);

(Continued)

(58) Field of Classification Search
None
See application file for complete search history.

(56) References Cited

U.S. PATENT DOCUMENTS 5,022,385 A    6/1991    Harza
5,155,685 A    10/1992   Kishi et al.
(Continued)

FOREIGN PATENT DOCUMENTS

JP    57-78813 A    5/1982
JP    62-53615 A    3/1987
(Continued)

OTHER PUBLICATIONS

English language translation of the International Preliminary Report on Patentability and Written Opinion dated Jun. 7, 2016 in PCT/JP2014/081351.

(Continued)

*Primary Examiner* — Mussa A Shaawat
*Assistant Examiner* — Kyung J Kim
(74) *Attorney, Agent, or Firm* — Oblon, McClelland, Maier & Neustadt, L.L.P.

(57) ABSTRACT

Airbags each belonging to one of first and second control blocks are arranged below the thighs of an occupant seated on a seat seating surface (S). Specifically, the first and second control blocks are arranged such that the airbags belonging thereto are adjacent to one another in the seat width direction. Further, a seat device controls the airbags belonging to the first control block and the airbags belonging to the second control block to alternately expand and contract.

11 Claims, 8 Drawing Sheets

(52) U.S. Cl.
CPC ............... *B60N 2/90* (2018.02); *B60N 2/914* (2018.02); *B60N 2/976* (2018.02); *A61H 2201/0149* (2013.01); *A61H 2201/0157* (2013.01); *A61H 2201/1654* (2013.01); *A61H 2201/5002* (2013.01); *A61H 2201/5071* (2013.01); *A61H 2205/086* (2013.01)

(56) References Cited

U.S. PATENT DOCUMENTS

| | | | |
|---|---|---|---|
| 6,055,473 | A | 4/2000 | Zwolinski et al. |
| 7,600,780 | B2 * | 10/2009 | Tobata .................... B60R 21/18 |
| | | | 280/733 |
| 2003/0038517 | A1 * | 2/2003 | Moran ................... B60N 2/448 |
| | | | 297/284.3 |

FOREIGN PATENT DOCUMENTS

| | | | |
|---|---|---|---|
| JP | 03-47206 | A | 2/1991 |
| JP | 2620445 | B2 | 3/1997 |
| JP | 2002-315657 | A | 10/2002 |
| JP | 2003-319990 | A | 11/2003 |
| JP | 2004-168224 | A | 6/2004 |
| JP | 2010-284414 | A | 12/2010 |

OTHER PUBLICATIONS

International Search Report dated Jan. 6, 2015 for PCT/JP2014/081351 filed on Nov. 27, 2014.

* cited by examiner

Fig.6A Before being filled with air

Fig.6B After being filled with air

Fig.6C After occupant is seated

SEAT DEVICE

TECHNICAL FIELD

The present invention relates to a seat device.

BACKGROUND ART

Conventionally, there is a seat device including airbags arranged below the seat seating surface and an internal pressure control unit for controlling the internal pressure of the airbags. For example, a seat device described in Patent Document 1 includes a pair of airbags, which is located at positions corresponding to the left buttock and the right buttock of the occupant seated on the seat seating surface. The internal pressure control unit is adapted to expand and contract the airbags alternately.

In this configuration, the buttocks of the occupant, which are supported above the airbags, are allowed to simulate walking movement. The seat device thus stimulates the muscles of the lower limbs of the occupant and promotes blood circulation, thus decreasing fatigue of the occupant.

A seat device described in Patent Document 2 detects seating of an occupant on a seat seating surface based on change of internal pressure of airbags. After detection of such seating, the seat device controls the internal pressure of the airbags to the target value.

A seat device described in Patent Document 3 detects the body size of an occupant seated on a seat seating surface through pressure detection. Based on the detected body size, the seat device executes internal pressure control on airbags.

PRIOR ART DOCUMENTS

Patent Documents

Patent Document 1: Japanese Patent No. 2620445
Patent Document 2: Japanese Laid-Open Patent Publication No. 62-53615
Patent Document 3: Japanese Laid-Open Patent Publication No. 3-47206

SUMMARY OF THE INVENTION

Problems that the Invention is to Solve

However, the seat device disclosed in Patent Document 1 affects the buttocks, which are merely the proximal sections of the lower limbs. This naturally limits the fatigue decreasing effect on the occupant through the simulated walking movement. The seat device thus has room for improvement in this respect.

Also, in the configurations of Patent Documents 2 and 3, the force by which the airbags hold the thighs of the occupant on the seat seating surface may vary depending on the position at which the occupant is seated. In this condition, the effect obtained by executing the internal pressure control on the airbags is likely to be restricted. In this regard, there is room for improvement.

Accordingly, the objective of the present invention is to provide a desirable seating state for an occupant seated on a seat.

Means for Solving the Problems

To achieve the foregoing objective and in accordance with one aspect of the present invention, a seat device is provided that includes a plurality of airbags and an internal pressure control unit. Each of the airbags extends in a front-rear direction of a seating surface of a seat at a position below the seating surface. The internal pressure control unit divides the airbags into a plurality of control blocks and is capable of controlling internal pressures of the airbags for the respective control blocks. The control blocks are set such that the airbags belonging to the different control blocks are arranged in a width direction of the seat at positions below each of the thighs of an occupant seated on the seating surface. The internal pressure control unit controls the airbags belonging to at least one of the control blocks to an expanded or contracted state opposite to the states of the airbags belonging to another one or other ones of the control blocks, and the internal pressure control unit shifts the control block subjected to opposite expanding or contracting state control as the time elapses.

For example, even by changing overall supporting pressure of the seat seating surface located below the thighs, compression of veins of the thighs cannot be effectively mitigated. In the above-described configuration, the thighs of the occupant seated on the seat seating surface are supported by the airbags that are controlled to be in the expanded states. Meanwhile, above the airbags controlled to be in the contracted states, the supporting pressure of the seat seating surface is decreased. Therefore, compression of the veins in the thighs is mitigated efficiently in the thighs in correspondence with such low supporting pressure zones.

Particularly, since the airbags extend in the front-rear direction of the seat seating surface to conform to the extending directions of veins, compression of the veins is mitigated further effectively. Also, by repeating compression and release of the veins, a pumping action is caused in the veins. This promotes blood circulation in the lower limbs, including the thighs, and thus decreases fatigue of the occupant. Additionally, the fatigue may be decreased also through a massaging effect.

MODES FOR CARRYING OUT THE INVENTION

A seat device according to a first embodiment will now be described with reference to FIGS. 1 to 3.

Figure 1:
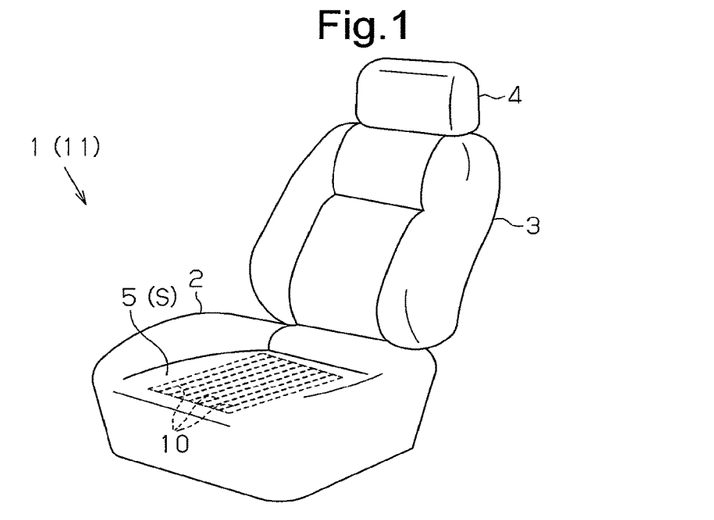
FIG. 1 is a perspective view showing a vehicle seat employing a seat device according to a first embodiment.

As shown in FIG. 1, a seat 1 for a vehicle includes a seat cushion 2 and a seat back 3, which is arranged in a manner inclinable with respect to the rear end section of the seat cushion 2. A head rest 4 is arranged at the upper end of the seat back 3. The seat cushion 2 includes seat upholstery 5, which configures a seat seating surface S, on which an occupant is seated.

Figure 2:
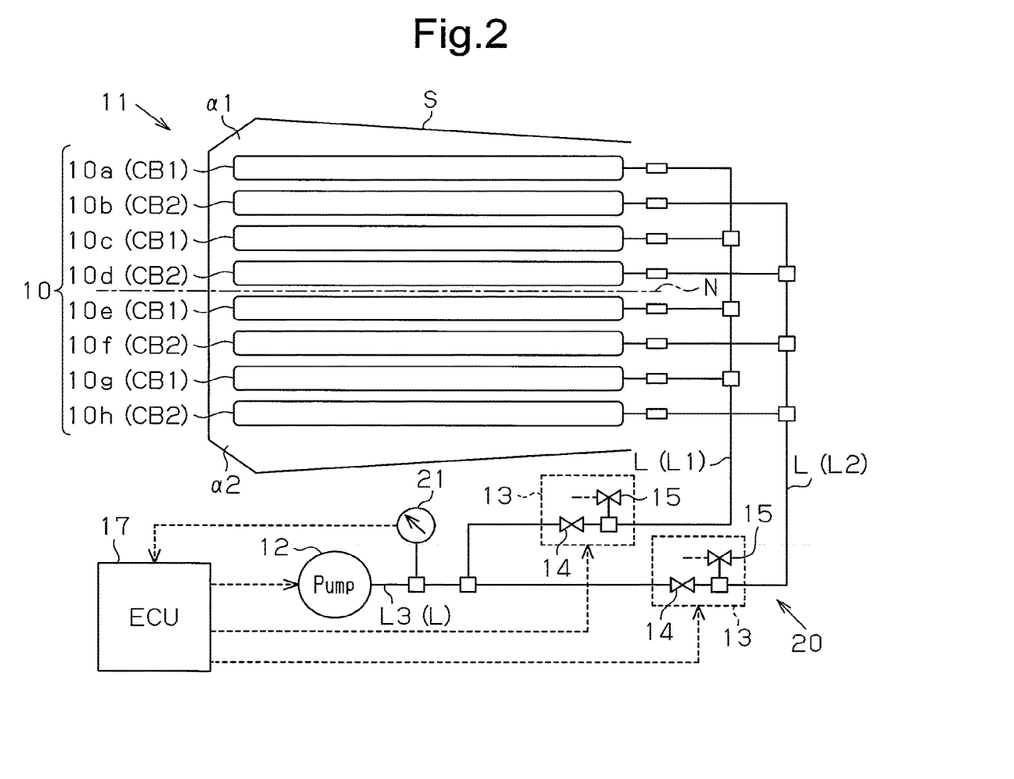
FIG. 2 is a schematic diagram representing the configuration of the seat device of the first embodiment.

With reference to FIG. 2, a seat device 11 is arranged in the vehicle. The seat device 11 includes an airbag unit 10. Referring to FIGS. 1, 2, and 3A to 3C, in the seat 1, the airbag unit 10 is arranged below the seat seating surface S, or, specifically, between the seat upholstery 5 and a seat cushion body 6. The seat device 11 of the first embodiment is capable of adjusting supporting pressure of the seat seating surface S for lifting the occupant seated on the seat seating surface S from below by controlling internal pressure of the airbag unit 10 and thus changing expanded and contracted states.

Specifically, as illustrated in FIG. 2, the seat device 11 of the first embodiment includes an internal pressure control unit 20, in addition to the airbag unit 10. The internal pressure control unit 20 includes an electronic control unit (ECU) 17, a pump 12, an air supply portion L, a plurality of valve units 13, and a pressure sensor 21. The air supply portion L, which connects the airbag unit 10 and the pump 12 to each other, are arranged between the airbag unit 10 and the pump 12. The air supply portion L includes a main air supply line L3 extending from the pump 12 and two, first and second, auxiliary air supply lines L1, L2, which are branched from the main air supply line L3. The pump 12 delivers air under pressure into the airbag unit 10 via the air supply portion L. Each of the two valve units 13 is arranged in the corresponding one of the first and second auxiliary air supply lines L1, L2. The pressure sensor 21 is arranged in the main air supply line L3. The ECU 17 is capable of controlling the internal pressure of the airbag unit 10 by controlling operation of the pump 12 and operation of each valve unit 13.

The airbag unit 10 is configured by a plurality of airbags 10a to 10h. Each of the airbags 10a to 10h has a substantially elongated bag-like shape and extends in the front-rear direction of the seat 1 (the left-right direction as viewed in FIG. 2). The eight airbags 10a to 10h (as viewed in the up-down direction in the drawing) are arranged in the seat width direction. The seat 1 is imaginarily divided in half into a first area α1 and a second area α2 by a center line N extending in the front-rear direction of the seat 1. The center line N extends between the four airbags 10a to 10d and the four airbags 10e to 10h.

Each valve unit 13 includes a stop valve 14, which blocks air supply by the pump 12, and an open valve 15, which communicates with the auxiliary air supply lines L1, L2 and is capable of releasing air from inside the airbags 10.

By switching the stop valve 14 to an open state and the open valve 15 to a closed state, the ECU 17 fills the airbags 10, which communicate with the auxiliary air supply lines L1, L2, with air. By switching the open valve 15 to an open state and the stop valve 14 to a closed state, the ECU 17 releases the air from inside the airbags 10, which communicate with the auxiliary air supply lines L1, L2. When the pressure in the air supply portion L, which is detected by the pressure sensor 21, reaches a predetermined value, the ECU 17 stops the air supply by the pump 12.

In this manner, by controlling the internal pressure in each of the airbags 10a to 10h, the internal pressure control unit 20 is capable of expanding or contracting the airbags 10.

The airbags 10a to 10h are divided into two control blocks CB1, CB2 based on the structures of the auxiliary air supply lines L1, L2, which correspond to two separate systems. Specifically, the four airbags 10a, 10c, 10e, 10g communicating with the first auxiliary air supply line L1 belong to the first control block CB1. The four airbags 10b, 10d, 10f, 10h communicating with the second auxiliary air supply line L2 belong to the second control block CB2. That is, the eight airbags 10a to 10h belong to the corresponding first and second control blocks CB1, CB2 alternately in the seat width direction. The internal pressure control unit 20 is capable of controlling the internal pressures of the airbags 10a to 10h separately in correspondence with the respective two control blocks CB1, CB2.

Figure 3A:
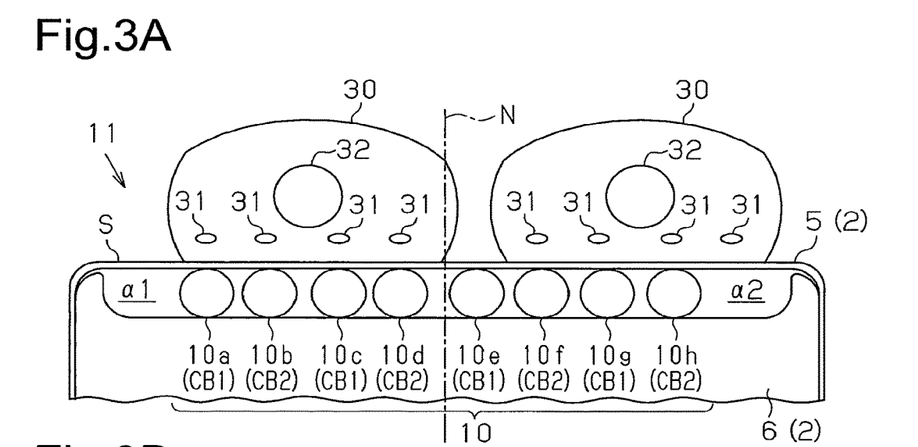
FIGS. 3A to 3C are explanatory diagrams illustrating operation of the seat device of the first embodiment.
Figure 3B:
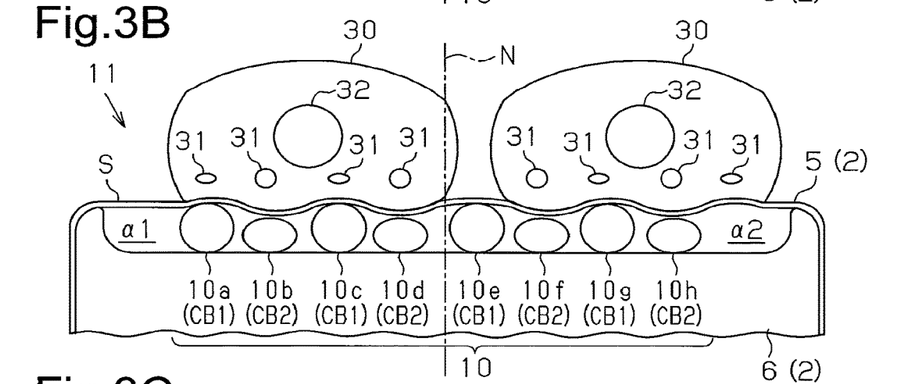
Figure 3C:
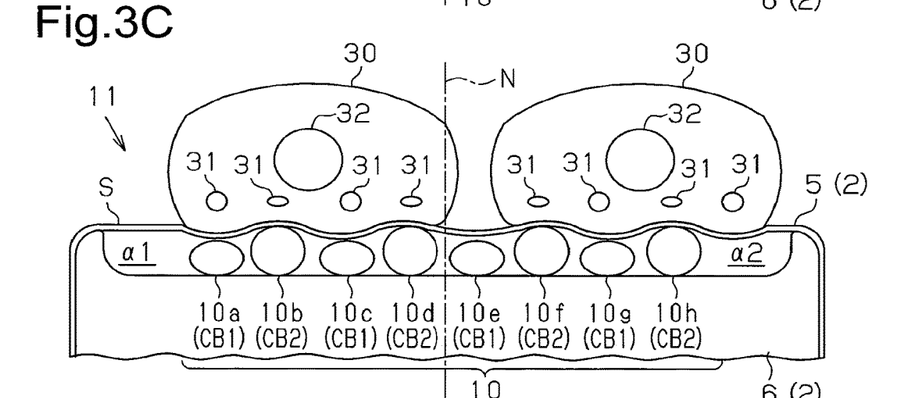
Figure 4:
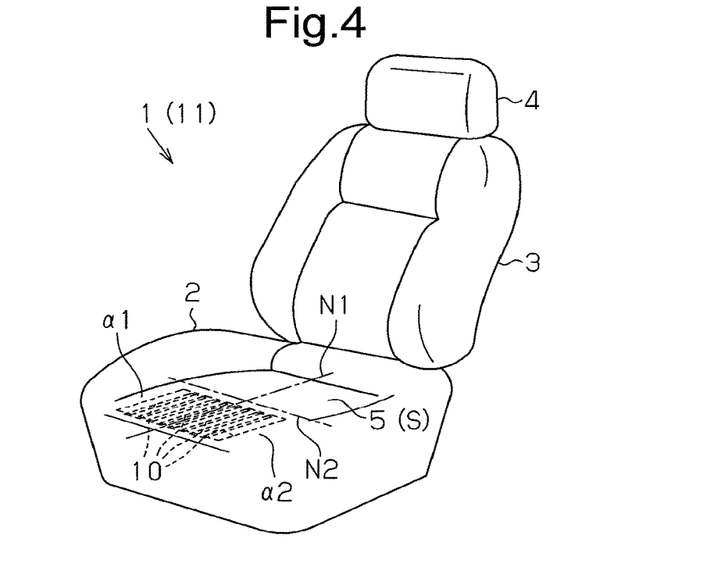
FIG. 4 is a perspective view showing a vehicle seat employing a seat device according to a second embodiment.

More specifically, with reference to FIGS. 3B and 3C, the internal pressure control unit 20 controls the four airbags 10a, 10c, 10e, 10g belonging to the first control block CB1 and the four airbags 10b, 10d, 10f, 10h belonging to the second control block CB2 to be expanded or contracted alternately.

With reference to FIG. 3A, the internal pressure control unit 20 has a basic control mode in which all the airbags 10a to 10h are held in an expanded state. Referring to FIG. 3B, the internal pressure control unit 20 has a first internal pressure adjustment mode, in which the airbags 10a, 10c, 10e, 10g belonging to the first control block CB1 are each controlled to be in an expanded state and the airbags 10b, 10d, 10f, 10h belonging to the second control block CB2 are each controlled to be in a contracted state. As illustrated in FIG. 3C, the internal pressure control unit 20 has a second internal pressure adjustment mode, in which the airbags 10b, 10d, 10f, 10h belonging to the second control block CB2 are each controlled to be in an expanded state and the airbags 10a, 10c, 10e, 10g belonging to the first control block CB1 are each controlled to be in a contracted state.

Referring to FIG. 3A, many of main veins 31 of the thighs 30 of an occupant are located on the backside of the thighs 30 (below the femurs 32) in the thighs 30 of the occupant. That is, when the occupant is seated on the seat seating surface S, the veins 31 are each in a state compressed by the body weight of the occupant and the supporting pressure of the seat seating surface S for lifting the thighs 30 from below. This inhibits blood circulation in the lower limbs and increases fatigue of the occupant.

To solve this problem, by executing the first and second internal pressure adjustment modes repeatedly, the internal pressure control unit 20 of the first embodiment expands and contracts each adjacent pair of the airbags 10a to 10h in the seat width direction alternately. The internal pressure control unit 20 maintains the basic control mode for a predetermined time after seating of the occupant on the seat seating surface S is detected. After the predetermined time elapses, the internal pressure control unit 20 repeats the first and second internal pressure adjustment modes. Also, before switching between the first and second internal pressure adjustment modes, the internal pressure control unit 20 executes the basic control mode between the first and second internal pressure adjustment modes. Using change of supporting pressure distribution caused by such operation, the seat device 11 stimulates the thighs 30 of the occupant seated on the seat seating surface S. This promotes blood circulation and decreases fatigue of the occupant.

Operation of the seat device 11 according to the first embodiment will now be described.

As illustrated in FIGS. 2 and 3A to 3C, in the first embodiment, two of the airbags 10 belonging to the first control block CB1 and two of the airbags 10 belonging to the second control block CB2 are alternately arranged in each of the first and second areas α1, α2 of the seat seating surface S. As a result, below each thigh 30 of the occupant seated on the seat seating surface S, at least one of the airbags belonging to the first control block CB1 and at least one of the airbags belonging to the second control block CB2 are located.

With respect to a reference state in which all the airbags 10 are expanded, the state in which the airbags belonging to the first control block CB1 and the airbags belonging to the second control block CB2 are expanded and contracted alternately can be referred to as a state in which the contracted ones of the airbags 10 are shifted as the time elapses.

That is, the internal pressure control unit 20 of the first embodiment controls the airbags belonging to one of the control blocks to be expanded or contracted in the opposite manner to the airbags belonging to the other control block. In this manner, as the time elapses, a control block X (airbags), which is controlled to be in the contracted state opposite to the state of the airbags belonging to the other control block, is shifted. For example, with reference to FIG. 3C, at a certain time point, the airbags that are controlled to be in the contracted states are the airbags 10a, 10c, 10e, 10g belonging to the first control block CB1. When a predetermined time elapses after the predetermined time point, referring to FIG. 3B, the airbags controlled to be in the contracted states are shifted from the airbags 10a, 10c, 10e, 10g belonging to the first control block CB1 to the airbags 10b, 10d, 10f, 10h belonging to the second control block CB2. Then, when another predetermined time elapses, with reference to FIG. 3C, the airbags controlled to be in the contracted states are shifted from the airbags 10b, 10d, 10f, 10h belonging to the second control block CB2 to the airbags 10a, 10c, 10e, 10g belonging to the first control block CB1. In this manner, sections receiving smaller supporting pressure move from one position to another in each of the thighs 30.

As illustrated in FIGS. 3B and 3C, the supporting pressure decreases in sections of the seat seating surface S located above the contracted ones of the airbags 10a to 10h. This decreases compression of the veins 31 located in correspondence with such low supporting pressure zones. Particularly, the airbags 10 of the first embodiment each have a substantially elongated bag-like shape extending in the front-rear direction of the seat seating surface S to conform to the extending direction of each of the veins 31 of the thighs 30. This decreases compression of the veins 31 further effectively. Blood circulation in the lower limbs including the thighs 30 is thus promoted.

By expanding and contracting the airbags 10 repeatedly, the supporting pressure of the seat seating surface S increases or decreases correspondingly. As a result, the veins 31 are compressed and released repeatedly. This causes a pumping effect in the veins 31, thus promoting blood circulation. Additionally, the muscles of the thighs 30 are stimulated to obtain a high massaging effect.

The first embodiment has the following advantages.

(1) Even by changing the overall supporting pressure of the seat seating surface S located below the thighs 30 by means of the airbags, as in the conventional techniques, compression of the veins cannot be effectively decreased. However, in the above-described configuration, the airbags controlled to be in the expanded states support the thighs 30 of the occupant seated on the seat seating surface S. Meanwhile, above the airbags controlled to be in the contracted states, the supporting pressure of the seat seating surface S is partially decreased. Such low supporting pressure zones efficiently decrease compression of the veins 31. Additionally, by repeating compression and release of the veins 31, a pumping effect is caused in the veins 31. This promotes blood circulation in the lower limbs including the thighs 30, thus decreasing fatigue of the occupant. Additionally, the fatigue is decreased also by a massaging effect.

(2) Before switching between the first and second internal pressure adjustment modes, the seat device 11 executes the basic control mode, in which the airbags 10 are held in the expanded state, between the first and second internal pressure adjustment modes. This enables the seat device 11 to support the thighs 30 of the occupant seated on the seat seating surface S further stably. By ensuring holding performance of the seat device 11 for holding the thighs 30 in a desired manner, seating comfort is improved.

Second Embodiment

A seat device according to a second embodiment will now be described with reference to FIGS. 4 to 9. Differences from the first embodiment will mainly be discussed below.

As illustrated in FIGS. 4 and 6A to 6C, in the second embodiment, ten airbags 10a to 10j are incorporated in the seat cushion 2. A first center line N1 and a second center line N2 are imaginarily set on the seat seating surface S. The first center line N1 extends in the front-rear direction of the vehicle to divide the airbags 10a to 10j in half in the seat width direction (the left-right direction as viewed in FIG. 6). The second center line N2 extends in the seat width direction to divide the seat seating surface S in half in the front-rear direction of the vehicle. A first area α1 and a second area α2 are set on a front side with respect to the second center line N2 as the boundary. The first area α1 is set on a right side in the vehicle proceeding direction with respect to the first center line N1 as the boundary. The second area α2 is set on a left side in the vehicle proceeding direction with respect to the first center line N1 as the boundary. The airbags 10a to 10j are located in the corresponding first area α1 and second area α2.

Figure 6A:
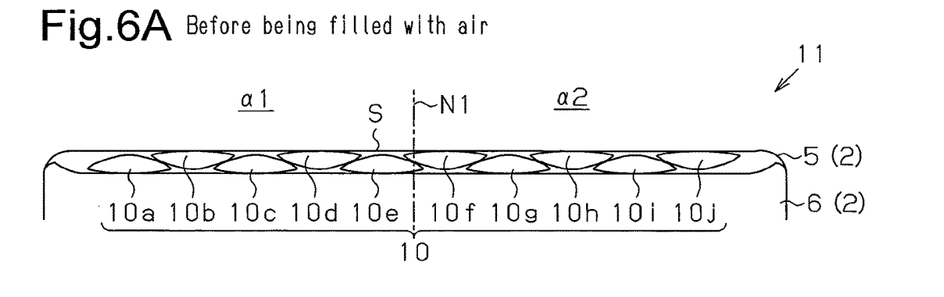
FIGS. 6A to 6C are explanatory diagrams illustrating operation of the seat device of the second embodiment.

Specifically, each of the airbags 10a to 10j has a substantially elongated bag-like shape extending in the front-rear direction of the seat seating surface S. Referring to FIG. 6A, the airbags 10a to 10j are located such that a longitudinal edge section of each of the airbags 10a to 10j and a corresponding longitudinal edge section of an adjacent one of the airbags 10a to 10j in the seat width direction vertically overlap with each other. For example, the lower surface of the left edge section and the lower surface of the right edge section of the airbag 10b are held in contact with the upper surface of the right edge section of the airbag 10a and the upper surface of the left edge section of the airbag 10c, respectively. Similarly, the lower surface of the left edge section and the lower surface of the right edge section of the airbag 10d are held in contact with the upper surface of the right edge section of the airbag 10c and the upper surface of the left edge section of the airbag 10e, respectively. The airbags 10f to 10j are located in the same manner. Each of the airbags 10a to 10j substantially has a triangular cross section extending in the seat width direction. The bottom side section of the cross section of each of the airbags 10a, 10c, 10e, 10g, 10i faces downward. The top section of the cross section of each of the airbags 10b, 10d, 10f, 10h, 10j faces upward.

Figure 5:
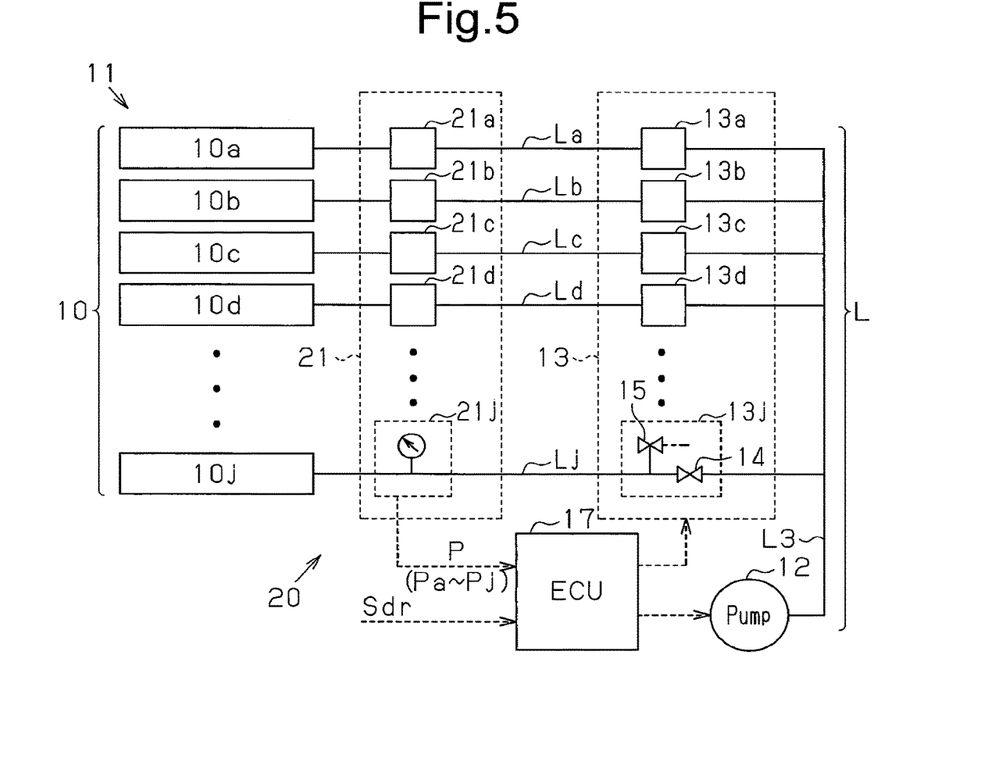
FIG. 5 is a schematic diagram representing the configuration of the seat device of the second embodiment.

With reference to FIG. 5, in the second embodiment, the air supply portion L includes a main air supply line L3 extending from the pump 12 and ten auxiliary air supply lines La to Lj, which are branched from the main air supply line L3. The air from the pump 12 is supplied to the airbags 10a to 10j through the auxiliary air supply lines L1 to Lj corresponding to multiple systems. In each of the auxiliary air supply lines La to Lj, the stop valve 14 for blocking air supply by the pump 12 and the open valve 15, which is capable of releasing air from inside the corresponding one of the airbags 10a, 10j communicating with the associated auxiliary air supply lines La to Lj, are arranged as the valve unit 13 (13a to 13j). Like the first embodiment, the electronic control unit (ECU) 17 controls operation of the pump 12 and operation of each of the valve units 13. In the second embodiment, the ECU 17 is capable of controlling the airbags 10a to 10j independently from one another. Therefore, unlike the first embodiment, there is no such concept as a control block.

Also referring to FIG. 5, in each auxiliary air supply line La to Lj, the pressure sensor 21 (21a to 21j) is arranged in the vicinity of the corresponding airbag 10 communicating with the auxiliary air supply line. The ECU 17 detects internal pressures Pa to Pj of the respective airbags 10a to 10j independently from one another based on an output signal of the associated pressure sensor 21. The ECU 17 has a function as a seating detection unit for detecting seating of the occupant H on the seat seating surface S based on internal pressure change of each airbag 10.

Figure 6B:
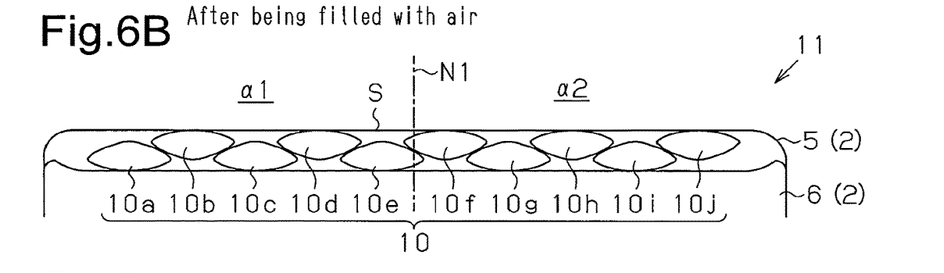
Figure 6C:
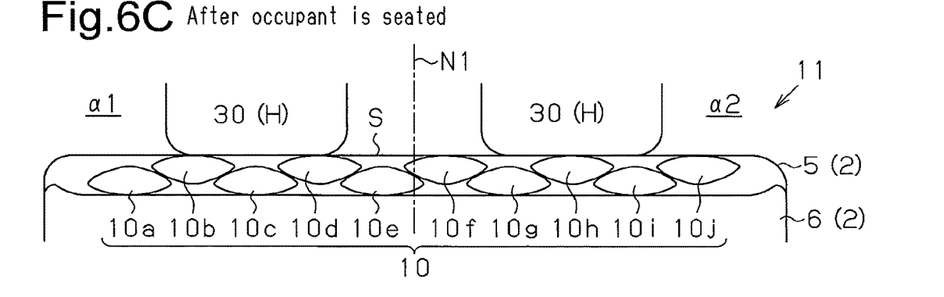

With reference to FIGS. 6A and 6B, the airbags 10a to 10j are expanded by being filled with air. Referring to FIG. 6C, when the occupant H is seated on the seat seating surface S, the airbags 10 are compressed by the body weight of the occupant H. By detecting increase of the internal pressure of each airbag 10, the ECU 17 detects seating of the occupant H on the seat seating surface S.

The ECU 17 has a function as a position detection unit for detecting the positions of the thighs 30 of the occupant H seated on the seat seating surface S based on distribution of internal pressure changes caused in the airbags 10a to 10j.

Figure 8:
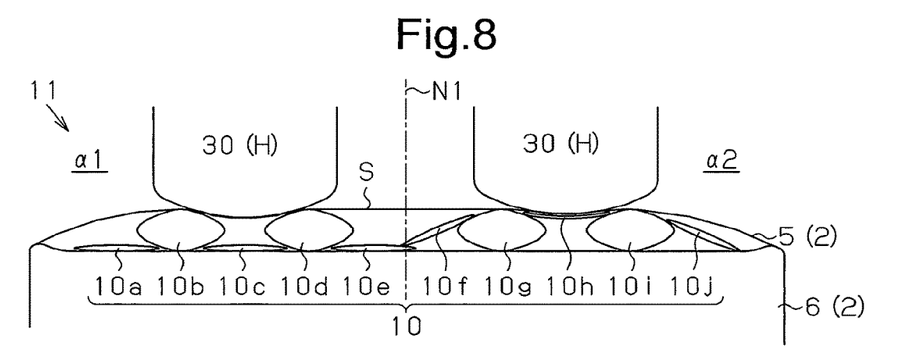
FIG. 8 is a diagram illustrating operation of the seat device of the second embodiment.

Specifically, as illustrated in FIG. 8, following detection of seating of the occupant H on the seat seating surface S, the ECU 17 identifies, in correspondence with internal pressure change caused by such seating of the occupant H, a group of airbags in which an internal pressure P exceeding a predetermined threshold value Pth is detected. The ECU 17 then determines that each thigh 30 of the occupant H is located above the identified group of airbags.

Figure 7:
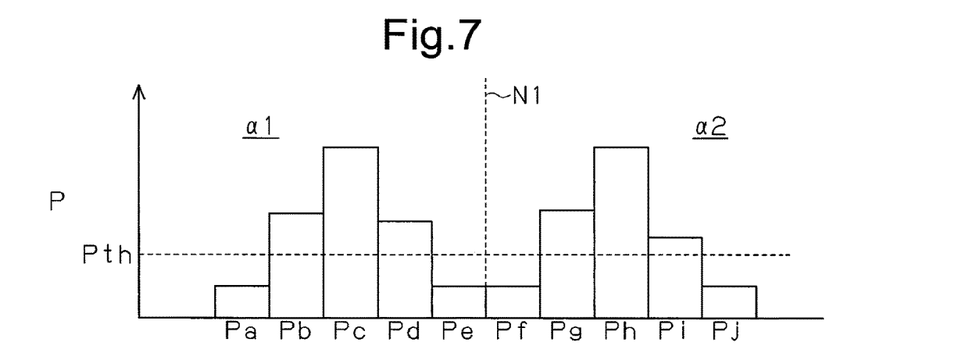
FIG. 7 is a diagram illustrating internal pressure changes caused by seating of an occupant and distribution of the internal pressure changes in the second embodiment.

For example, in the example shown in FIGS. 6C and 7, among the airbags 10a to 10j arranged in the seat width direction, the internal pressures Pb to Pd of the airbags 10b to 10d, which are located adjacent to each other in the first area α1, and the internal pressures Pg to Pi of the airbags 10g to 10i, which are located adjacent to each other in the second area α2, each exceed the predetermined threshold value Pth. In this case, based on distribution of such internal pressure changes, the ECU 17 determines that the thighs 30 of the occupant H are located above these two groups of airbags.

Also, among the airbags 10a to 10j located below the two thighs 30, the ECU 17 determines that each two airbags located at opposite ends in the seat width direction are the airbags located at the positions corresponding to the lateral edge sections of the corresponding one of the thighs 30.

Generally, the force by which each thigh 30 of the occupant H depresses the airbags located below the seat seating surface S becomes greater toward the middle section of the thigh 30 and smaller toward each lateral edge section of the thigh 30. For example, in the example shown in FIG. 7, in both a first group of the airbags 10b to 10d and a second group of the airbags 10g to 10i, which are located below the thighs 30, the internal pressures Pc, Ph of the airbags 10c, 10h each located in the middle of the corresponding group are the maximum values. Based on such distribution of internal pressure changes, the ECU 17 determines that the airbags 10b, 10d are the airbags located at the positions corresponding to the lateral edge sections of the corresponding thigh 30 in the first area α1 and that the airbags 10g, 10i are the airbags located at the positions corresponding to the lateral edge sections of the corresponding thigh 30 in the second area α2.

As illustrated in FIG. 8, in this example, the internal pressure control unit 20 increases the internal pressures P (Pb, Pd, Pg, Pi) of the airbags 10b, 10d, 10g, 10i located at the positions corresponding to the lateral edge sections of the thighs 30 based on the results of position detection by the ECU 17, which configures a control calculating section of the internal pressure control unit 20. Further, the internal pressure control unit 20 decreases the internal pressures P of the airbags 10a, 10c, 10e, 10f, 10h, 10j, other than the airbags 10b, 10d, 10g, 10i located at the positions corresponding to the lateral edge sections of the thighs 30, to contract the airbags 10a, 10c, 10e, 10f, 10h, 10j. This enables the seat device 11 to hold the thighs 30 in a desired manner regardless of the seating position of the occupant.

Next, internal pressure control of the airbags 10 executed by the ECU 17 and procedure steps of the control will be described. The ECU 17 configures a control calculating section for the internal pressure control unit 20, a pressure detection unit, and the position detection unit.

Figure 9:
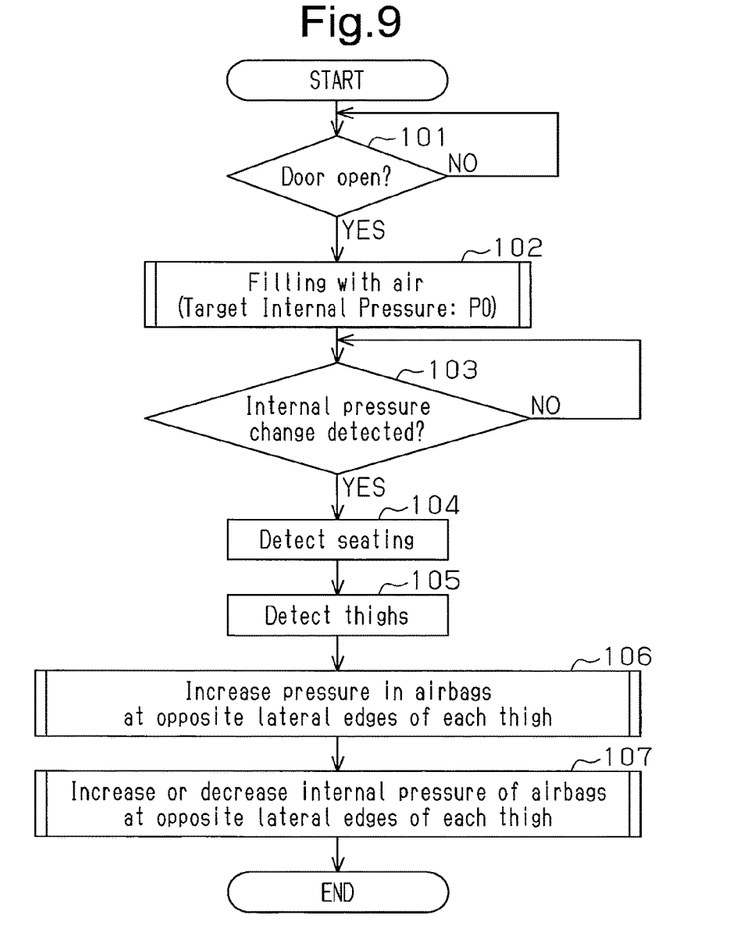
FIG. 9 is a flowchart representing internal pressure control of airbags and procedure steps of the control according to the second embodiment.

With reference to the flowchart of FIG. 9, when no occupant is in the vehicle, the ECU 17 of the second embodiment detects opening operation of a vehicle door (not shown) based on a door operation signal Sdr (see FIG. 5), which is input from a non-illustrated door sensor. If the opening operation of the vehicle door is detected (Step 101: YES), the ECU 17 executes an air-filling control on the airbags located below the seat seating surface S in the above-described manner (Step S102, see FIGS. 6A and 6B). At this stage, the ECU 17 controls the pump 12 and the valve units 13 such that the internal pressure P of each airbag 10 achieves a target internal pressure P0.

The ECU 17 also detects internal pressure change of each airbag 10 by comparing the internal pressure P of each airbag, which is detected by the corresponding pressure sensor 21, with the predetermined threshold value Pth. If the internal pressure change of each airbag 10 is detected (Step 103: YES), the ECU 17 determines that the occupant H is seated on the seat seating surface S (Step 104, see FIG. 6C).

Further, based on distribution of detected pressure changes, the ECU 17 detects the thighs 30 of the occupant H seated on the seat seating surface S (Step 105, see FIG. 7). Based on the detection result, the ECU 17 controls the internal pressure P of each of the airbags that are located at the positions corresponding to the lateral edge sections of the thighs 30 to increase (Step 106, see FIG. 8).

Also, after having increased the internal pressure P of each of the airbags located at the positions corresponding to the lateral edge sections of the thighs 30, the ECU 17 of the second embodiment controls the internal pressure P of each airbag to increase or decrease as the time elapses (Step 107). Therefore, by promoting blood circulation in the lower limbs including the thighs 30, the seat device 11 of the second embodiment decreases fatigue of the occupant.

Operation of the seat device 11 according to the second embodiment will now be described.

By increasing the internal pressures P of the airbags 10 located at the positions corresponding to the lateral edge sections of the thighs 30, these airbags 10 are shifted to the expanded states. Each of the thighs 30 is thus held between the airbags corresponding to the lateral edge sections of the thigh 30 in the seat width direction. This increases the force for holding the thighs 30 on the seat seating surface S.

Many of main veins of each thigh 30 of the human body are located on the backside of the thigh 30. That is, when the occupant H is seated on the seat seating surface S, the veins are in a state compressed by the body weight of the occupant and the supporting pressure of the seat seating surface S acting on each thigh 30 from below.

However, by controlling the internal pressure of each airbag 10 as has been described, distribution of the supporting pressure of the seat seating surface S for lifting the thighs 30 of the occupant H from below is changed. That is, by increasing the supporting pressure on the lateral edge sections of each thigh 30, the supporting pressure on the middle section of the thigh 30 is decreased relatively. This decreases compression of the veins, thus promoting blood circulation in the lower limbs including the thighs 30.

Further, by increasing or decreasing the internal pressures of the airbags 10 located at the positions corresponding to the lateral edge sections of each thigh 30, the supporting pressure of the seat seating surface S on the lateral edge sections are increased or decreased correspondingly. This causes a pumping effect in the veins, thus promoting blood circulation in the veins. Additionally, by stimulating the muscles of the thighs 30, a high massaging effect is obtained.

The seat device of the second embodiment has the following advantages.

(3) The ECU 17 detects the internal pressures Pa to Pj of the airbags 10 independently from one another based on the output signals of the corresponding pressure sensors 21a to 21j, which are arranged in the auxiliary air supply lines La to Lj of the airbags 10a to 10j. The ECU 17 also detects the positions of the thighs 30 based on distribution of internal pressure changes caused by seating of the occupant H on the seat seating surface S. Then, based on the detection result, the ECU 17 controls the internal pressures of the airbags located at the positions corresponding to the lateral edge sections of the thighs 30 to increase.

This configuration enables the seat device 11 to detect the thighs 30 of the occupant H seated on the seat seating surface S through simple configuration and with high accuracy. The seat device 11 then increases the internal pressures P of the airbags 10 located at the positions corresponding to the lateral edge sections of the thighs 30 and thus expands these airbags 10. This increases the force for holding the thighs 30 on the seat seating surface S. As a result, regardless of the seating position of the occupant H, holding performance for holding the thighs 30 desirably is ensured.

In this manner, distribution of the supporting pressure of the seat seating surface S for lifting the thighs 30 of the occupant H from below is changed. That is, by increasing the supporting pressure on the lateral edge sections of each thigh 30, the supporting pressure on the middle section of the thigh 30 is decreased relatively. This decreases compression of the veins that run in the thighs 30. As a result, blood circulation is promoted in the lower limbs including the thighs 30, thus decreasing fatigue of the occupant.

(4) Each airbag 10 has a substantially elongated bag-like shape extending in the front-rear direction of the seat seating surface at a position below the seat seating surface S.

In this configuration, the airbags 10 are arranged to conform to the thighs 30. This ensures a desired state of the aforementioned holding performance. Compression of the veins is thus decreased further effectively and blood circulation is promoted.

(5) The airbags 10a to 10i are located such that each of the edge sections extending in the front-rear direction of the seat seating surface overlaps with the corresponding edge section of an adjacent one of the airbags in the seat width direction.

This configuration increases the number of the airbags that can be located in a constant surface area. As a result, the seat device 11 improves the resolution of internal pressure changes of the airbags 10 and enhances detection accuracy of the seat seating surface S through simple configuration. That is, the seat device 11 is capable of controlling supporting pressure distribution with further improved accuracy. The thighs 30 are thus supported in a desired manner. Also, when the occupant H is seated on the seat seating surface S, the seat device 11 detects the positions of the thighs 30 based on distribution of internal pressure changes caused in the airbags 10. Therefore, detection accuracy of the positions of the thighs 30 is also improved. This ensures a further desired state of the aforementioned holding performance.

(6) After having increased the internal pressures P of the airbags located at the positions corresponding to the lateral edge sections of the thighs 30, the ECU 17 controls the internal pressures P of these airbags to increase or decrease as the time elapses. This configuration increases or decreases the supporting pressure of the seat seating surface S for holding the lateral edge sections of the thighs 30 from below. A pumping effect is thus caused in the veins and promotes blood circulation in the veins. Additionally, by stimulating the muscles of the thighs 30, a high massaging effect is obtained.

(7) The internal pressure control unit 20 (the ECU 17) decreases the internal pressures of the airbags (for example, the airbags 10a, 10c, 10e, 10f, 10h, 10j) other than the airbags located at the positions corresponding to the lateral edge sections of the thighs 30 (for example, the airbags 10b, 10d, 10g, 10i), thus controlling the corresponding airbags to the contracted state. This configuration brings about a further great change in the distribution of supporting pressure of the seat seating surface S and decreases the supporting pressure corresponding to the middle section of each thigh. As a result, a further desired state of the aforementioned holding performance is ensured. Further, compression of the veins is decreased further effectively and blood circulation is promoted in the veins.

(8) The airbags 10 are arranged in the corresponding first area α1 and second area α2, which are located on the front side of the seat seating surface S. Many of the main veins of each of the thighs 30 are located on the backside of the thigh 30. These veins run closer to the upholstery surface and shallower at a position closer to the side corresponding to the knee, which is a position more forward in the seat seating surface S. As a result, the above-described configuration decreases compression of the veins further effectively and promotes blood circulation in the veins.

The above described embodiments may be modified as follows.

In the first embodiment, the internal pressure control unit 20 supplies each of the airbags 10 with the air delivered under pressure by the pump 12 via the two systems of the auxiliary air supply lines L1, L2. However, the present invention is not restricted to this and the configuration of the internal pressure control unit 20, including the numbers and locations of the auxiliary air supply lines L1, L2 and the valve units 13, may be modified as needed. The second embodiment can be modified in the same manner.

In the first embodiment, the airbags 10a, 10c, 10e, 10g belonging to the first control block CB1 and the airbags 10b, 10d, 10f, 10h belonging to the second control block CB2, which communicate with the second auxiliary air supply line L2, are located alternately and arranged in the seat width direction. However, the present invention is not restricted to this and setting of the control blocks may be modified as needed as long as the multiple airbags 10a to 10h belonging to different control blocks are arranged in the seat width direction at positions below the thighs 30.

Figure 10A:
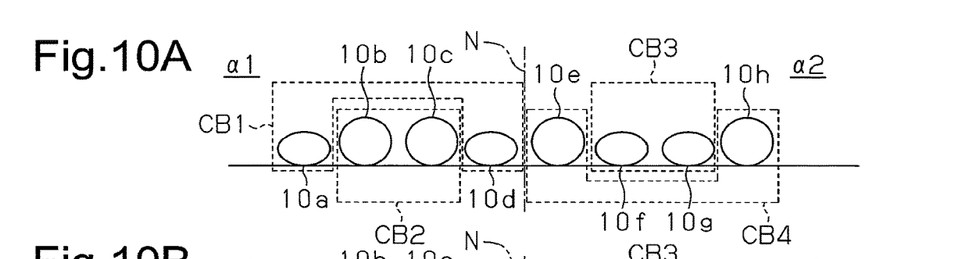
FIGS. 10A and 10B are explanatory diagrams illustrating a modification of the first embodiment in terms of setting of control blocks.
Figure 10B:
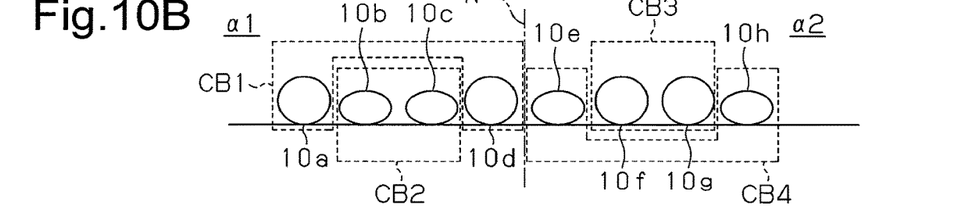

For example, in the example shown in FIGS. 10A and 10B, a total of eight airbags 10a to 10h are located in the seat width direction four by four below the corresponding areas α1, α2 of the seat seating surface S, which is divided into the two areas with respect to the center line N in the seat width direction, as in the first embodiment. In this example, the airbags 10a, 10d, 10e, 10h located at the opposite end sections of each area α1, α2 in the seat width direction are set for a control block different from a control block for which the airbags 10b, 10c, 10f, 10g located in the middle section in the area α1, α2 are set.

Specifically, the airbags 10a, 10d located at the opposite end sections of the first area α1 in the seat width direction are set for the first control block CB1. The airbags 10b, 10c located in the middle section of the first area α1 are set for the second control block CB2. The airbags 10f, 10g located in the middle section of the second area α2 are set for a third control block CB3. The airbags 10e, 10h located at the opposite end sections of the second area α2 in the seat width direction are set for a fourth control block CB4.

In this example, the airbags 10f, 10g belonging to the third control block CB3 are expanded and contracted synchronously with the airbags 10a, 10d belonging to the first control block CB1. The airbags 10e, 10h belonging to the fourth control block CB4 are expanded and contracted synchronously with the airbags 10b, 10c belonging to the second control block CB2. In this manner, the airbags belonging to each adjacent pair of the control blocks in the seat width direction are controlled to be expanded and contracted alternately. This configuration also ensures advantages similar to the advantages of the second embodiment.

In the first embodiment, with respect to the reference state in which all the airbags 10 are expanded, the airbags 10a to 10h belonging to the corresponding first and second control blocks CB1, CB2 are expanded and contracted alternately. In this manner, the contracted ones of the airbags 10a to 10h are shifted from one control block to the other as the time elapses. However, the present invention is not restricted to this and the form of such shifting may be modified as needed as long as at least one control block is controlled such that the airbags belonging to this control block are each in an expanded or contracted state opposite to the state of each of the airbags belonging to another control block and the control block subjected to the expanding or contracting control opposite to the control of the airbags belonging to another control block is shifted as the time elapses.

Figure 11A:
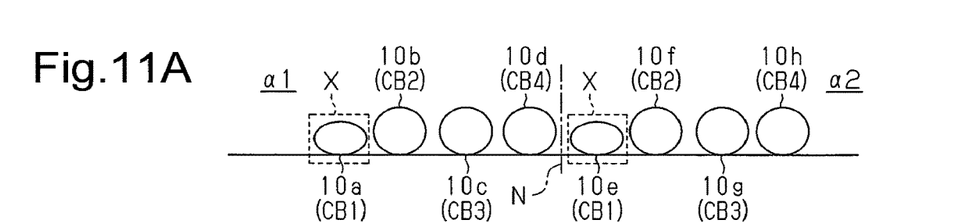
FIGS. 11A to 11D are explanatory diagrams illustrating the forms of control of the modification of the first embodiment in terms of shifting of a control block subjected to expanding or contracting control opposite to the control of another control block.
Figure 11B:
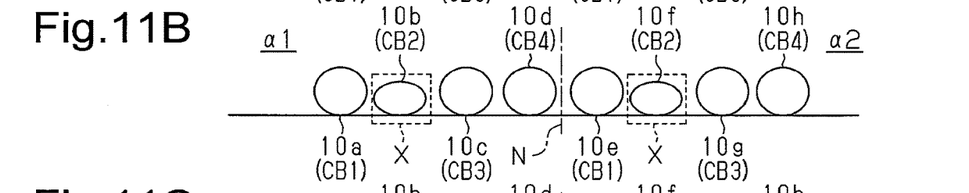
Figure 11C:
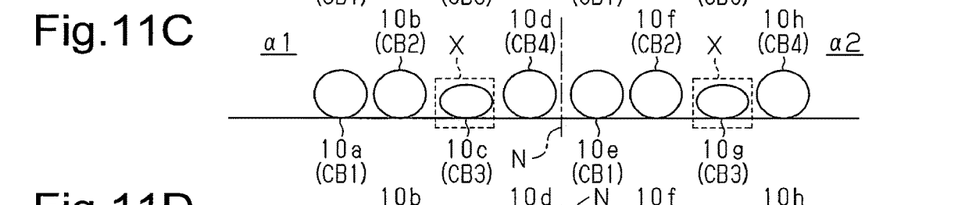
Figure 11D:
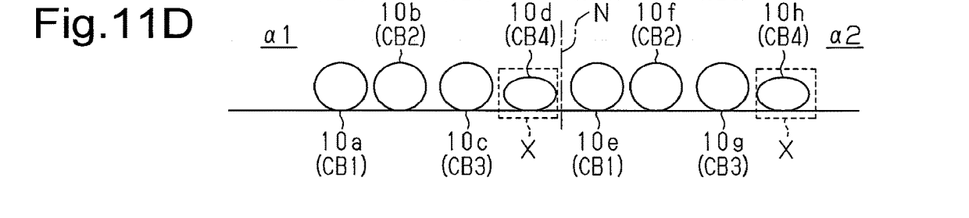

For example, in the example shown in FIGS. 11A to 11D, the airbags 10a to 10d and 10e to 10h located below the areas α1 and α2 are set for the first to fourth control blocks CB1 to CB4 sequentially from the left side as viewed in the drawings. In this example, the control block X subjected to the expanding or contracting control opposite to the control of the other control blocks, which is the control block in which the two airbags belonging to the control block are in a contracted state, is shifted from one control block to the adjacent control block in the seat width direction sequentially from the left side to the right side as viewed in the drawings. For example, in FIG. 11A, the airbags 10a, 10e belong to the control block X. In FIG. 11B, the airbags 10b, 10f belong to the control block X. Therefore, the block X is shifted from the control block CB1 to the control block CB2.

This configuration also ensures advantages similar to the advantages of the first embodiment. Between the two areas α1 and α2, the timings for shifting the control block X does not necessarily have to be synchronous. Also, the shifting direction of the control block X does not necessarily have to be a single direction and the control block X does not necessarily have to be shifted between each adjacent pair of the control blocks. The control block X may be shifted randomly. This configuration also promotes blood circulation effectively and ensures a high massaging effect.

Figure 12:
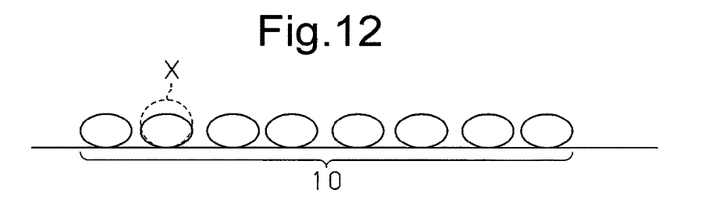
FIG. 12 is a diagram illustrating a modification of the second embodiment in terms of a basic control mode.

Alternatively, as illustrated in FIG. 12, a state in which all the airbags 10 are contracted may be the reference state. In this configuration, a control block X in which airbags are controlled to be in expanded states may be shifted as the time elapses.

That is, a high supporting pressure zone is formed in a section of the seat seating surface S such that the veins 31 located above the high supporting pressure zone are compressed. Afterwards, the control block X controlled to be in the expanded states is shifted to decrease compression of the veins 31. This causes a pumping effect in the veins 31 and thus promotes blood circulation in the lower limbs including the thighs 30. Additionally, a high massaging effect is obtained.

Figure 13A:
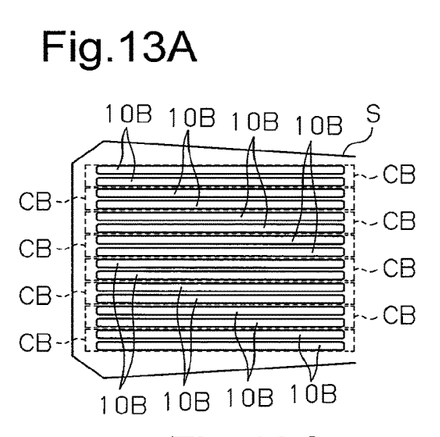
FIGS. 13A and 13B are explanatory diagrams illustrating a modification of the second embodiment in terms of the airbag shapes and the control block setting.

In the first embodiment, the number and the length of the airbags 10 arranged below the seat seating surface S may be modified as needed. For example, as illustrated in FIG. 13A, airbags 10B narrower than the airbags of the above illustrated embodiments may be used. In this case, multiple adjacent ones (in this example, adjacent two) of the airbags 10B in the seat width direction may belong to the same control block CB.

Figure 13B:
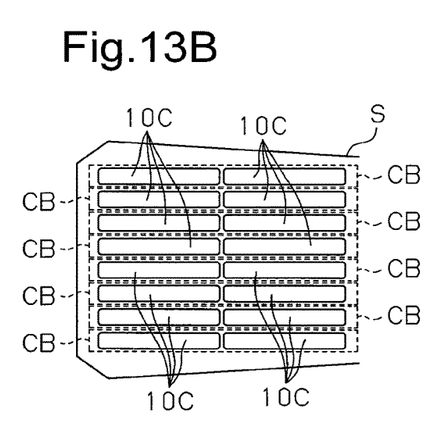

Alternatively, with reference to FIG. 13B, airbags 10C shorter than the airbags of the above illustrated embodiments may be used. In this case, multiple ones (in this example, two) of the airbags 10C arranged in series in the front-rear direction of the seat seating surface S may belong to the same control block CB.

Figure 13C:
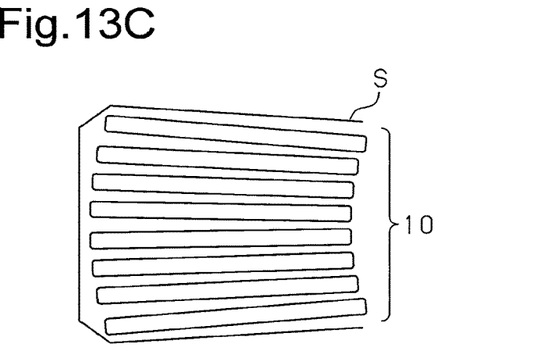
FIG. 13C is a diagram illustrating a modification of the second embodiment in terms of the arrangement of airbags.

Also, the arrangement form of the airbags 10 may be modified as needed. For example, as illustrated in FIG. 13C, the airbags 10 may be arranged radially to become more spaced apart from the rear side to the front side of the seat seating surface S (from the right side to the left side as viewed in the drawing).

That is, in many cases, the thighs 30 of the occupant seated on the seat seating surface S are located substantially in a V shape such that the knees, which are located forward from the thighs 30, become open. Therefore, the above-described configuration promotes blood circulation further effectively, thus decreasing fatigue of the occupant. Also in the second embodiment, the number, shape, and locations of the airbags 10 located below the seat seating surface S may be modified as needed. For example, in the second embodiment, the shape and arrangement of the airbags shown in FIGS. 13A to 13C may be employed. Further, in the second embodiment, corresponding edge sections of the airbags do not necessarily have to overlap with each other.

Particularly, in the second embodiment, to obtain the above-described effect by increasing the internal pressures P of the airbags 10 located at the positions corresponding to the lateral edge sections of the thighs 30, it is preferable to locate at least three airbags below each of the thighs 30.

Figure 14:
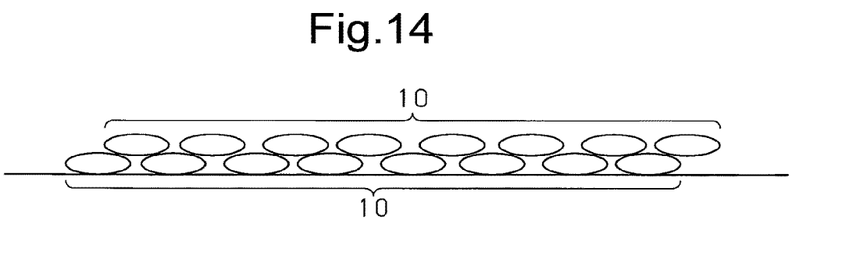
FIG. 14 is a diagram illustrating a modification of the second embodiment in terms of the arrangement of airbags.

Like the second embodiment, the first embodiment may be configured with the airbags 10 arranged such that, with reference to FIG. 14, the longitudinal edge sections of each adjacent pair of the airbags 10 overlap with each other in the direction perpendicular to the seat seating surface S. This configuration, through simple configuration, improves the resolution, which influences distribution of the supporting pressure of the seat seating surface S by expanding and contracting the airbags 10.

The above-described "form in which peripheral edge sections of adjacent airbags overlap with each other" may be a configuration other than the configuration of the example shown in FIG. 14, in which adjacent ones of the airbags 10 are located up and down alternately. For example, the form may be a configuration in which an edge section of a certain airbag in the seat width direction is located below the corresponding edge section of an adjacent airbag and the other edge section of the certain airbag in the seat width direction is located above the corresponding edge section of the other adjacent airbag. In this case, the certain airbag is located in an inclined state with respect to the two adjacent airbags. The airbags may be arranged in the same manner in the second embodiment.

In the first embodiment, before switching between the first and second internal pressure adjustment modes, the basic control mode, in which all the airbags 10 are maintained in the expanded state, is executed between the first and second internal pressure adjustment modes. However, the present invention is not restricted to this and may be adapted in any other manner as long as, before the control block X is shifted as has been described, at least the airbags 10 located below the thighs 30 are all controlled to be in uniform expanded or contracted states. For example, all the airbags 10 may be controlled to be in an intermediate state between the expanded state and the contracted state. Alternatively, such control that brings about uniform states of the airbags 10 does not necessarily have to be performed before shifting the control block X.

In the second embodiment, the airbags other than the airbags located at the positions corresponding to the lateral edge sections of the thighs 30 are controlled to be in the contracted states by decreasing the internal pressures P of the airbags.

Figure 15:
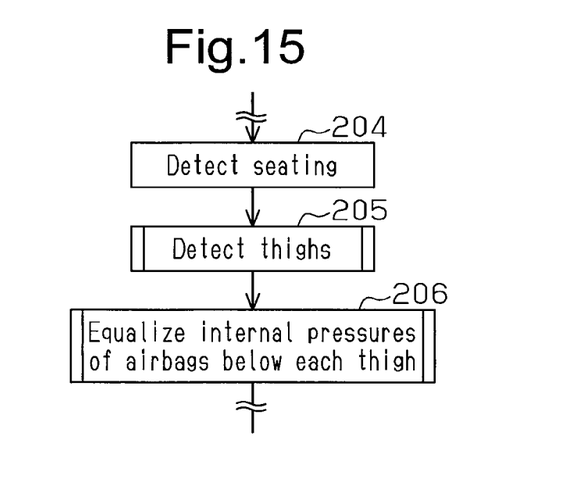
FIG. 15 is a flowchart representing a modification of the second embodiment in terms of the internal pressure control of airbags.

However, the present invention is not restricted to this and may be adapted such that, as represented in FIG. 15, seating of the occupant H on the seat seating surface S is detected (Step 204), the thighs 30 are detected (step 205), and then the internal pressures P of the airbags 10 located below the thighs 30 are equalized (Step 206). Afterwards, as in the second embodiment, the internal pressures P of the airbags 10 located at the positions corresponding to the lateral edge sections of the thighs 30 are increased. Alternatively, in addition to this, the internal pressures P of the other ones of the airbags 10 are decreased. This configuration also ensures a further desired state of the aforementioned holding performance. Further, compression of the veins is decreased further effectively and blood circulation is promoted in the veins.

Figure 16:
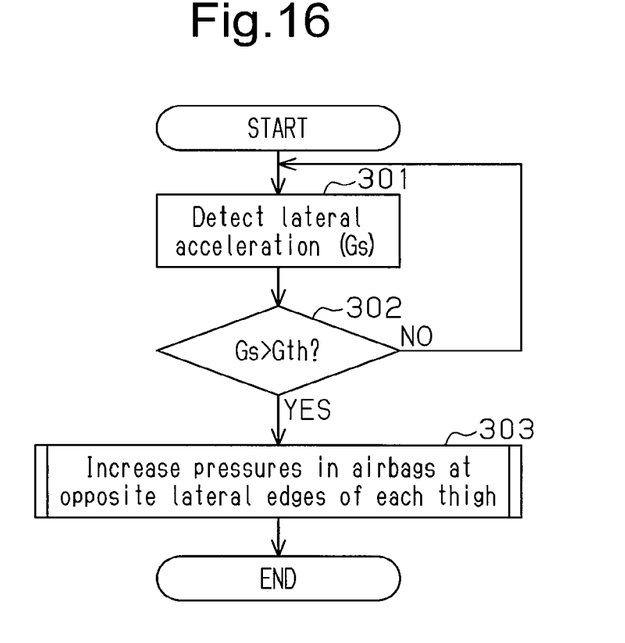
FIG. 16 is a flowchart representing a modification of the second embodiment in terms of the internal pressure control of airbags.

With reference to FIG. 16, the ECU 17 may detect the lateral acceleration Gs of the vehicle (Step 301). When the lateral acceleration Gs exceeds a predetermined threshold value Gth (Step 302: YES), the ECU 17 increases the internal pressures P of the airbags located at the positions corresponding to the lateral edge sections of the thighs 30 (Step 302). The lateral acceleration Gs is detected using a lateral G sensor, which is mounted in the vehicle. This ensures that the aforementioned holding performance reliably resist the lateral acceleration Gs.

In this case, the ECU 17 may increase only the pressures of the airbags located on the side in the seat width direction on which the lateral acceleration Gs acts, or, in other words, the outer positions in the turning radius direction when the vehicle is turned.

Although the seat device 11 is employed in a vehicle in the above illustrated embodiments, the seat device 11 may be employed for any other objects than vehicles.

Next, the technical ideas obtainable from the above embodiments are described below with their advantages.

(a) A seat device characterized in that the airbags are arranged on the front side of the seat seating surface. That is, many of the main veins in each of the thighs are located on the backside of the thigh. The veins run closer to the skin and shallower at a position closer to the side corresponding to the knee, which is a position more forward in the seat seating surface. This configuration decreases compression of the veins further effectively, thus promoting blood circulation.

(b) A seat device characterized in that the internal pressure control unit increases the internal pressures of the airbags located at the positions corresponding to the lateral edge sections when the lateral acceleration of the vehicle exceeds a predetermined threshold value. This ensures that holding performance reliably resist the lateral acceleration.

(c) A seat device characterized in that the position detection unit determines that the thighs are located above adjacent groups of airbags in which internal pressures exceeding a predetermined threshold value are detected. In this manner, the thighs of an occupant seated on the seat seating surface are detected with high accuracy through simple configuration.

(d) A seat device characterized in that the position detection unit determines that the two airbags located at the opposite ends in the seat width direction, among the airbags located below each thigh, are the airbags located at the positions corresponding to the lateral edge sections of the thigh. In this manner, the airbags located at the positions corresponding to the lateral edge sections of each thigh are identified with high accuracy through simple configuration.

(e) The seat device further characterized by a pressure detection unit for detecting internal pressure of each of the airbags and a position detection unit for detecting each thigh of an occupant seated on the seat seating surface based on distribution of internal pressure changes caused in the airbags.

DESCRIPTION OF THE REFERENCE NUMERALS

1 ... Seat, 2 ... Seat Cushion, 5 ... Seat Upholstery, 10 (10a to 10j), 10B, 10C ... Airbag, 11 ... Seat Device, 12 ... Pump (Internal Pressure Control Unit), 13, 13a to 13j ... Valve Unit (Internal Pressure Control Unit), 14 ... Stop Valve, 15 ... Open Valve, 21, 21a to 21j ... Pressure Sensor (Internal Pressure Control Unit), 15 ... ECU (Internal Pressure Control Unit), 20 ... Internal Pressure Control Unit, 30 ... Thigh, 31 ... Vein, 32 ... Femurs, S ... Seat Seating Surface, N, N1, N2 ... Center line, α1, α2 ... Area, L1, L2, La to Lj ... Auxiliary Air Supply Line (Internal Pressure Control Unit), L3 ... Main Air Supply Line (Internal Pressure Control Unit), CB, CB1 to CB4 ... Control Block

The invention claimed is:

1. A seat device comprising:
a plurality of airbags arranged in a seat width direction at positions below a seating surface of a seat;
an internal pressure control unit for controlling an internal pressure of each of the airbags;
a pressure detection unit for detecting the internal pressure of each of the airbags; and
a position detection unit for detecting the position of each of the thighs of an occupant seated on the seating surface based on distribution of internal pressure changes caused in the airbags,
wherein the internal pressure control unit increases the internal pressures of the airbags located at the positions corresponding to lateral edge sections of each thigh in the seat width direction.

2. The seat device according to claim 1, wherein the internal pressure control unit increases or decreases the internal pressures of the airbags located at the positions corresponding to the lateral edge sections of each thigh in the seat width direction as the time elapses.

3. The seat device according to claim 1, wherein, among the airbags located below the thighs, the internal pressure control unit decreases the internal pressure of each of the airbags other than the airbags located at the positions corresponding to the lateral edge sections.

4. The seat device according to claim 1, wherein the internal pressure control unit controls the internal pressures of the airbags located below the thighs to be equalized.

5. The seat device according to claim 1, wherein, when a lateral acceleration of a vehicle exceeds a predetermined threshold value, the internal pressure control unit increases the internal pressures of the airbags located at the positions corresponding to the lateral edge sections.

6. The seat device according to claim 1, wherein the position detection unit determines that the thighs are located above adjacent ones of the airbags in which the internal pressures exceeding a predetermined threshold value are detected.

7. The seat device according to claim 1, wherein the position detection unit determines that, among the airbags located below each of the thighs, two airbags located at opposite ends in the seat width direction are located at the positions corresponding to the lateral edge sections of the thigh in the seat width direction.

8. The seat device according to claim 1, wherein the airbags each extend in the front-rear direction of the seating surface of the seat.

9. The seat device according to claim 1, wherein the airbags are arranged radially to become more spaced apart from the rear side to the front side of the seating surface of the seat.

10. The seat device according to claim 1, wherein the airbags are arranged such that an edge section of each of the airbags extending in a direction perpendicular to the seat width direction overlaps with adjacent one of the airbags.

11. A seat device comprising:
a plurality of airbags arranged below a seat seating surface and arranged in a seat width direction, wherein an edge section of each of the airbags extending in a direction perpendicular to the seat width direction is arranged to overlap with adjacent one of the airbags,
a pressure detection unit configured to detect an internal pressure of each of the airbags, and
a position detection unit configured to detect the position of each of the thighs of an occupant seated on the seat seating surface based on distribution of internal pressure changes caused in the airbags.

* * * * *